US011294959B2

(12) United States Patent
Li et al.

(10) Patent No.: US 11,294,959 B2
(45) Date of Patent: Apr. 5, 2022

(54) DATA FILTERING AND MINING USING MULTIPLE-LEVEL, COMPOSITE-ATTRIBUTE TREE-NODE DIAGRAMS

(71) Applicant: LANDMARK GRAPHICS CORPORATION, Houston, TX (US)

(72) Inventors: Wanqiang Li, Beijing (CN); Haiting Li, Tianjin (CN); Kiran Gopala Reddy Sunanda, Bangalore (IN)

(73) Assignee: LANDMARK GRAPHICS CORPORATION, Houston, TX (US)

(*) Notice: Subject to any disclaimer, the term of this patent is extended or adjusted under 35 U.S.C. 154(b) by 332 days.

(21) Appl. No.: 15/527,648

(22) PCT Filed: Jan. 14, 2015

(86) PCT No.: PCT/US2015/011428
§ 371 (c)(1),
(2) Date: May 17, 2017

(87) PCT Pub. No.: WO2016/114774
PCT Pub. Date: Jul. 21, 2016

(65) Prior Publication Data
US 2017/0344662 A1    Nov. 30, 2017

(51) Int. Cl.
*G06F 16/30* (2019.01)
*G06F 16/901* (2019.01)
*G06F 16/26* (2019.01)

(52) U.S. Cl.
CPC .......... *G06F 16/9027* (2019.01); *G06F 16/26* (2019.01)

(58) Field of Classification Search
CPC .................. G06F 16/2246; G06F 16/9027
USPC ....... 707/607, 609, 687, 705, 769, 790, 813, 707/821
See application file for complete search history.

(56) References Cited

U.S. PATENT DOCUMENTS

| | | | |
|---|---|---|---|
| 2002/0052873 A1 | 5/2002 | Delgado et al. | |
| 2003/0204513 A1* | 10/2003 | Bumbulis | ........... G06F 16/2246 |
| 2004/0039786 A1 | 2/2004 | Horvitz et al. | |
| 2004/0267958 A1* | 12/2004 | Reed | ...................... H04L 45/00 709/238 |
| 2005/0027710 A1 | 2/2005 | Ma et al. | |
| 2008/0201340 A1 | 8/2008 | Thonangi | |
| 2012/0151356 A1 | 6/2012 | Wagenblatt | |

OTHER PUBLICATIONS

International Preliminary Report on Patentability; PCT Application No. PCT/US2015/011428; dated Jul. 27, 2017.
Preliminary French Search Report and Written Opinion; French Application No. 1562202; dated Dec. 8, 2017.
Washio, Takashi et al., "State of the Art of Graph-Based Data Mining", ACM SIGKDD Explorations Newsletter; Association for Computing Machinery, Inc.; vol. 5, No. 1, pp. 59-68; Jul. 1, 2003.
International Search Report and Written Opinion; PCT Application No. PCT/US2015/011428; dated Jun. 30, 2015.
Office Action; Norway Application No. 20171061; dated Mar. 24, 2020.

* cited by examiner

*Primary Examiner* — Sana A Al-Hashemi
(74) *Attorney, Agent, or Firm* — Polsinelli PC

(57) ABSTRACT

Systems and methods for data filtering and mining using multiple-level, composite-attribute tree-node diagrams to quickly select and analyze data of interest.

20 Claims, 11 Drawing Sheets

| Row No. | A | B | K1 | K2 | K3 | ... | Kn | X | ... | ... |
|---|---|---|---|---|---|---|---|---|---|---|
| 1 | a1 | b1 | k1 | k2 | k3 | ... | N/A | x1 | ... | ... |
| 2 | a1 | b1 | k1 | k2 | k4 | ... | N/A | x2 | ... | ... |
| 3 | a1 | b1 | k1 | k2 | k4 | ... | N/A | x3 | ... | ... |
| 4 | a2 | b2 | k1 | k4 | k5 | ... | N/A | x4 | ... | ... |
| 5 | a2 | b3 | k1 | k4 | k6 | ... | N/A | x5 | ... | ... |
| 6 | a2 | b3 | k2 | k7 | N/A | ... | N/A | x6 | ... | ... |

FIG. 13

| Row No. | A | B | K | X | ... | ... | ... | ... |
|---|---|---|---|---|---|---|---|---|
| 1 | a1 | b1 | k1\|k2\|k3 | x1 | ... | ... | ... | ... |
| 2 | a1 | b1 | k1\|k2\|k4 | x2 | ... | ... | ... | ... |
| 3 | a1 | b1 | k1\|k2\|k4 | x3 | ... | ... | ... | ... |
| 4 | a2 | b2 | k1\|k4\|k5 | x4 | ... | ... | ... | ... |
| 5 | a2 | b3 | k1\|k4\|k6 | x5 | ... | ... | ... | ... |
| 6 | a2 | b3 | k2\|k7 | x6 | ... | ... | ... | ... |

FIG. 14

| Row No. | Attribute Index Table | X | ... | ... | ... | ... |
|---|---|---|---|---|---|---|
| 1 | 1 | x1 | ... | ... | ... | ... |
| 2 | 2 | x2 | ... | ... | ... | ... |
| 3 | 2 | x3 | ... | ... | ... | ... |
| 4 | 3 | x4 | ... | ... | ... | ... |
| 5 | 4 | x5 | ... | ... | ... | ... |
| 6 | 5 | x6 | ... | ... | ... | ... |

| Mapping Table: | A | B | K |
|---|---|---|---|
| 1 | a1 | b1 | k1\|k2\|k3 |
| 2 | a1 | b1 | k1\|k2\|k4 |
| 3 | a2 | b2 | k1\|k4\|k5 |
| 4 | a2 | b3 | k1\|k4\|k6 |
| 5 | a2 | b3 | k2\|k7 |

FIG. 15

DATA FILTERING AND MINING USING MULTIPLE-LEVEL, COMPOSITE-ATTRIBUTE TREE-NODE DIAGRAMS

CROSS-REFERENCE TO RELATED APPLICATIONS

This application is a national stage entry of PCT/US2015/11428 filed Jan. 14, 2015, said application is expressly incorporated herein in its entirety. STATEMENT REGARDING FEDERALLY SPONSORED RESEARCH
Not applicable.

FIELD OF THE DISCLOSURE

The present disclosure generally relates to systems and methods for data filtering and mining using multiple-level, composite-attribute tree-node diagrams. More particularly, the present disclosure relates to data filtering and mining using multiple-level, composite-attribute tree-node diagrams to quickly select and analyze data of interest.

BACKGROUND

In most situations involving large and complex datasets with many fields or columns, conventional data filtering and mining is used to sort through the whole dataset for data of interest. The traditional approach therefore, requires selecting the preferred field(s), identifying key words in the field(s) for data filtering, culling key data from the field(s) and analyzing the key data to find the data of interest. Typically, multiple fields or columns must be analyzed before identifying key words for data filtering. And, more importantly, the whole dataset must be reviewed to select the preferred field(s).

BRIEF DESCRIPTION OF THE DRAWINGS

The present disclosure is described below with references to the accompanying drawings in which like elements are referenced with like reference numerals, and in which:

FIG. 13 is a table illustrating a general data structure with multiple fields.

FIG. 14 is a table illustrating an optimization of the general data structure illustrated in FIG. 13.

FIG. 15 is an attribute index table and a mapping table for the attribute index table illustrating an optimization of the data structure illustrated in FIG. 14.

DETAILED DESCRIPTION OF THE PREFERRED EMBODIMENTS

Figure 1:
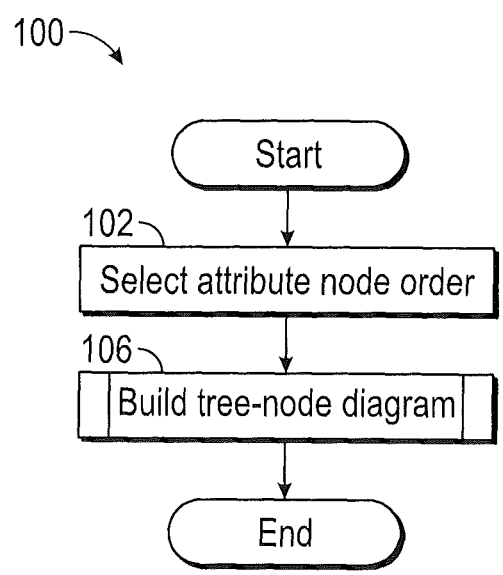
FIG. 1. is a flow diagram illustrating one embodiment of a method for implementing the present disclosure.

The present disclosure overcomes one or more deficiencies in the prior art by providing systems and methods for data filtering and mining using multiple-level, composite-attribute tree-node diagrams to quickly select and analyze data of interest.

In one embodiment, the present disclosure includes a method for a method for filtering data using a multiple-level, composite-attribute tree-node diagram, which comprises: i) building a K tree comprising multiple K nodes and one or more K node paths using a computer processor, wherein each K node path includes a K node that represents a root node and another K node that represents a last node; ii) connecting one or more A nodes to at least one of 1) each root node in the K tree, wherein each A node is connected to at least one of the root nodes in the K tree; 2) a respective last node in the K tree; and 3) a respective B node; iii) connecting one or more B nodes to at least one of 1) each root node in the K tree, wherein each B node is connected to at least one of the root nodes in the K tree; 2) a respective last node in the K tree; and 3) a respective A node; and iv) wherein each K node represents a key attribute node that uniquely identifies a message, each A node represents a computer attribute node and each B node represents a computer attribute node.

In another embodiment, the present disclosure includes a non-transitory program carrier device tangibly carrying computer-executable instructions for filtering data using a multiple-level, composite-attribute tree-node diagram, the instructions being executable to implement: i) building a K tree comprising multiple K nodes and one or more K node paths, wherein each K node path includes a K node that represents a root node and another K node that represents a last node; ii) connecting one or more A nodes to at least one of 1) each root node in the K tree, wherein each A node is connected to at least one of the root nodes in the K tree; 2) a respective last node in the K tree; and 3) a respective B node; iii) connecting one or more B nodes to at least one of 1) each root node in the K tree, wherein each B node is connected to at least one of the root nodes in the K tree; 2) a respective last node in the K tree; and 3) a respective A node; and iv) wherein each K node represents a key attribute node that uniquely identifies a message, each A node represents a computer attribute node and each B node represents a computer attribute node.

In yet another embodiment, the present disclosure includes a non-transitory program carrier device tangibly carrying computer-executable instructions for filtering data using a multiple-level, composite-attribute tree-node diagram, the instructions being executable to implement: i) building a K tree comprising multiple K nodes and one or more K node paths, wherein each K node path includes a K node that represents a root node and another K node that represents a last node; ii) connecting one or more A nodes to at least one of 1) each root node in the K tree, wherein each A node is connected to at least one of the root nodes in the K tree; 2) a respective last node in the K tree; and 3) a respective B node; iii) connecting one or more B nodes to at least one of 1) each root node in the K tree, wherein each B node is connected to at least one of the root nodes in the K tree; 2) a respective last node in the K tree; and 3) a respective A node; iv) wherein each K node represents a key attribute node that uniquely identifies a message, each A node represents a computer attribute node, each B node represents a computer attribute node; and v) the tree-node diagram including multiple data fields, wherein the multiple K nodes are not restrained to a single data field.

The subject matter of the present disclosure is described with specificity; however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. The present disclosure may be applied in many different industries to quickly select and analyze data of interest such as, for example, data for optimizing oil and gas production and data for predicting weather patterns.

METHOD DESCRIPTION

The following description includes methods for data filtering and mining using multiple-level, composite-attribute tree-node diagrams to quickly select and analyze data of interest. In this manner, the data of interest may be visualized in multiple-levels using the composite-attribute tree-node diagrams to select only the data of interest rather than the whole dataset. Because the data have one or more attributes, the attributes may be used to build a tree-node diagram. The tree-node diagram illustrates data fields using different classes of nodes (A, B, K . . . ), also referred to herein as A nodes, B nodes and K nodes, wherein A nodes may represent a computer, B nodes may represent an application and K nodes may represent a key attribute node that uniquely identifies a message. A, B and K nodes are used to identify the messages since multiple computers may be used to run the same application or even thousands of applications. Because each application has multiple states (e.g. error, warning, information, success), A, B and K nodes are used to identify what kind of messages came from which application and from which computer. Additional classes of nodes may be used to represent additional data fields and each class of node may include one or more attribute nodes such as, for example, A (a1, a2, a3 . . . ), B (b1, b2, b3 . . . ), and K (k1, k2, k3 . . . ). Each attribute node is either a parent (root) node or a child node and may include a tag to designate its selection. An attribute node path connects a root node to one or more child nodes, each of which may lie in one or more node paths. Attribute nodes for A, B nodes are restrained to a single level data field in the tree-node diagram while attribute nodes for K nodes are not restrained to a single level data field and may include internal connections when multi-level data fields are used. The contents of the K nodes may be defined by the applications (i.e. B nodes) that send messages to the system.

Referring now to FIG. 1, a flow diagram of one embodiment of a method 100 for implementing the present disclosure is illustrated.

Figure 17:
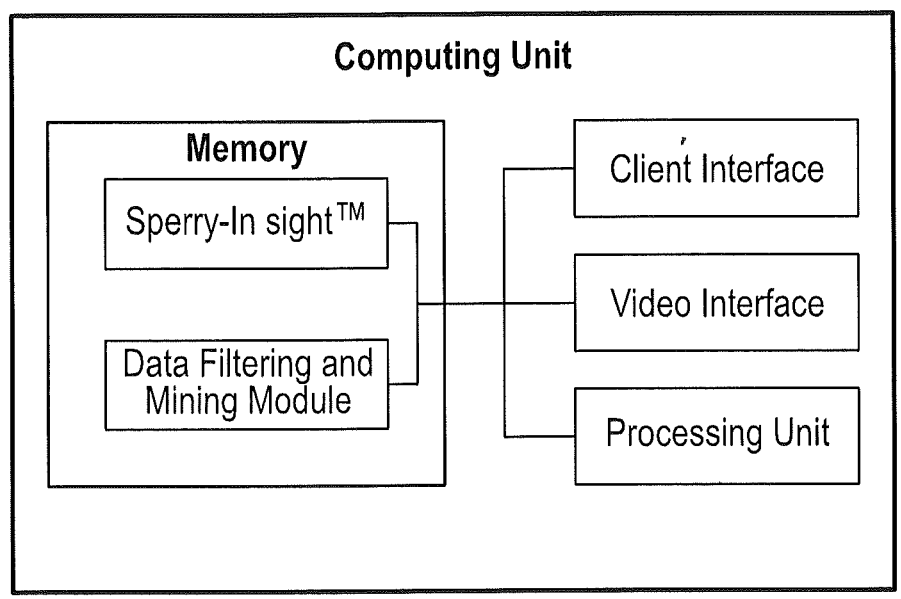
FIG. 17 is a block diagram illustrating one embodiment of a computer system for implementing the present disclosure.

In step 102, a preferred attribute node order is selected using the client interface and/or the video interface described further in reference to FIG. 17. One attribute node order may include, for example, A nodes, K nodes and B nodes. The attribute node order will depend on the priority of filtering the data fields in which the attribute nodes lie. Using the same attribute node order as an example (A nodes, K nodes, B nodes), the data associated with the A nodes is the highest priority to filter followed by the data associated with the K nodes and the data associated with the B nodes being the lowest priority to filter.

Figure 2:
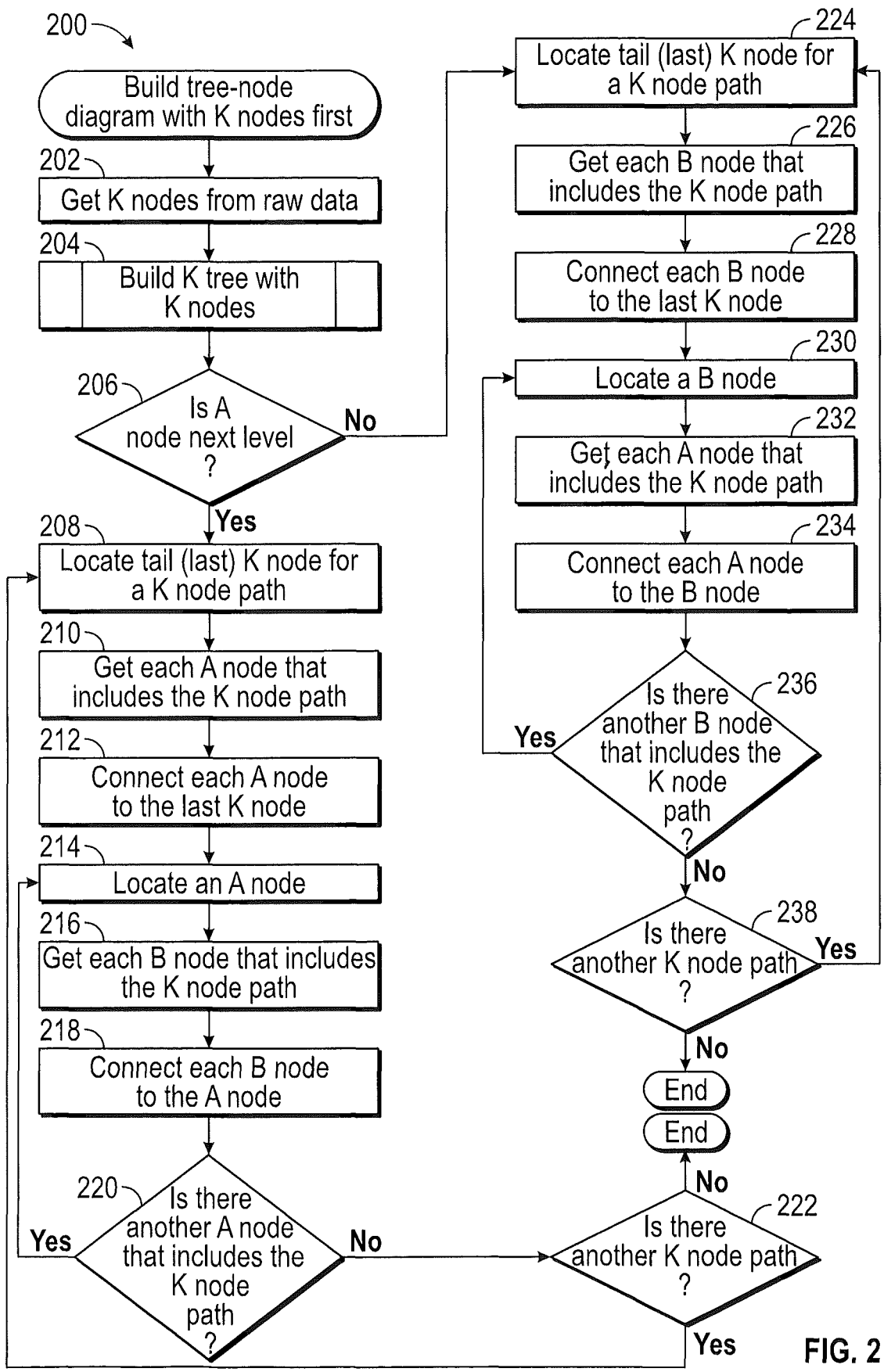
FIG. 2. is a flow diagram illustrating one embodiment of a method for performing step 106 in FIG. 1.
Figure 3:
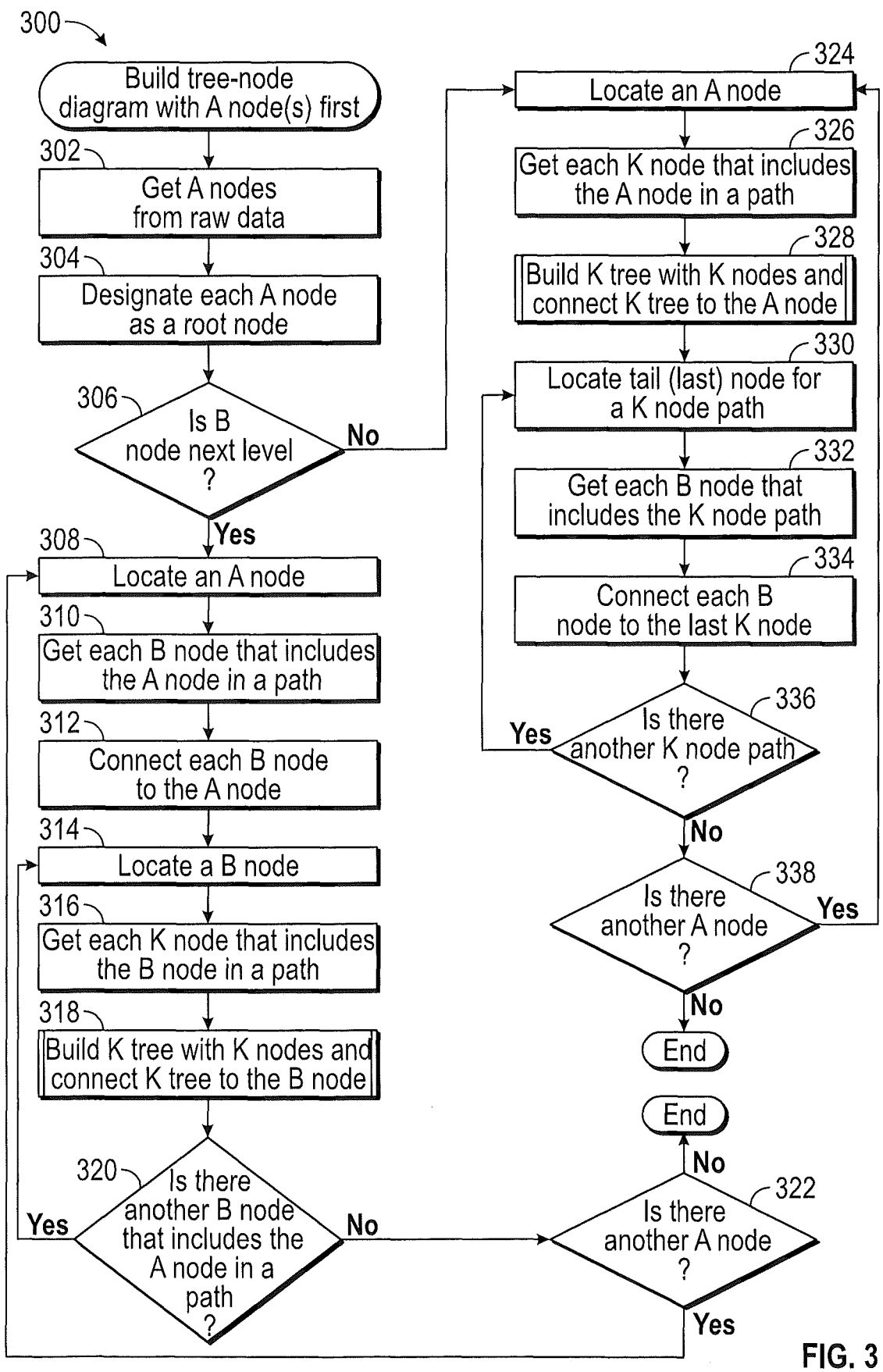
FIG. 3. is a flow diagram illustrating another embodiment of a method for performing step 106 in FIG. 1.
Figure 4:
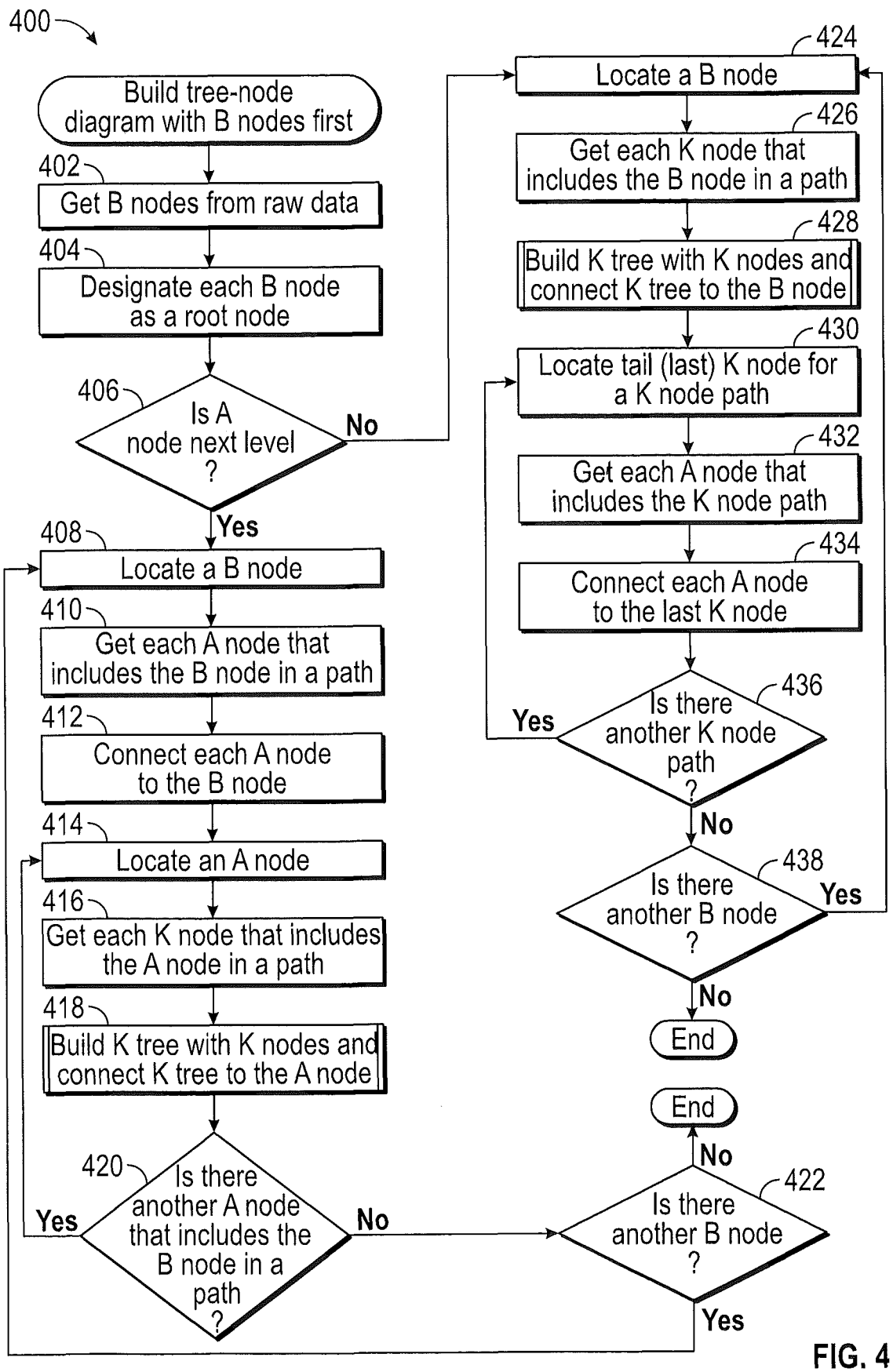
FIG. 4. is a flow diagram illustrating another embodiment of a method for performing step 106 in FIG. 1.
Figure 6:
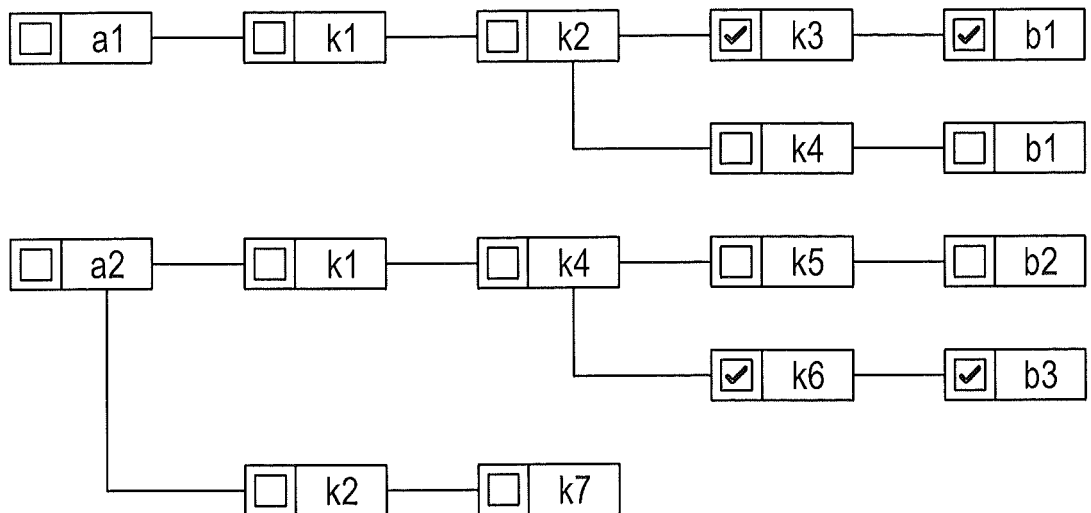
FIG. 6 is an exemplary tree-node diagram illustrating the result of step 106 in FIG. 1.

In step 106, a tree-node diagram is built using the attribute node order selected in step 102. Different embodiments of methods for performing this step are described further in reference to FIGS. 2-4 subject to the attribute order selected in step 102. Because different classes of nodes may be used to represent additional data fields, those skilled in the art will understand that the embodiments illustrated in FIGS. 2-4 are exemplary and may be used to address different classes of nodes. In FIG. 6, an exemplary tree-node diagram illustrates the result of this step based on a selected attribute node order of A nodes, K nodes and B nodes. As illustrated, certain attribute nodes include a tag (check) to designate their selection for following associated data of interest using the client interface and/or the video interface described further in reference to FIG. 17. Here, two paths have been selected: a1-k1|k2|k3-b1 and a2-k1|k4|k6-b3. That means the data of interest is associated with the attribute nodes that meet the following conditions:

A=a1, K=k1|k2|k3 or K1=k1, K2=k2 and K3=k3;

A=a2, K=k1|k4|k60r K1=k1, K2=k4 and K3=k6.

The method 100 may produce connected paths in the tree-node diagram as illustrated in FIG. 6 by a1-k1-k2-k3-b1 and a1-k1-k2-k4-b1, for example. The method 100 may also produce separate paths in the tree-node diagram as illustrated in FIG. 6 by a1-k1-k2-k3-b1 and a2-k1-k4-k5-b2. And, each separate or connected path may include one or more of the same attribute node as illustrated by k1 and k2 in FIG. 6. If the portion of each path from a parent (root) node is the same, then the common nodes can be reused. For example, given 3 paths: Path 1: a1-k1-k2-k3; Path 2: a1-k1-k2-k4; and Path 3: a1-k1-k3-k4, the attribute nodes a1, k1 can be reused since all 3 paths have the same portion a1-k1. But the k3 nodes in Path 1 and Path 3 will be different nodes since that portion of their paths is not the same. Once the data of interest is identified in this manner, also referred to as mining, it may be visualized without having to visualize the whole dataset. As a result, the method 100 enables users to quickly select and analyze data of interest without having to review the whole dataset.

Referring now to FIG. 2, a flow diagram of one embodiment of a method 200 for performing step 106 in FIG. 1 is illustrated. In this embodiment, the method 200 builds a tree-node diagram with K nodes first based on the attribute node order selected in step 102.

In step 202, all K nodes are retrieved from the raw data (i.e. whole dataset).

In step 204, a K tree is built with the K nodes retrieved in step 202. One embodiment of a method for performing this step is described further in reference to FIG. 5.

In step 206, the method 200 determines if the A nodes are the next level based on the attribute node order selected in step 102. If the A nodes are not the next level (i.e. K nodes, B nodes, A nodes), then the method 200 proceeds to step 224. Otherwise, the method 200 proceeds to step 208 because the attribute node order is K nodes, A nodes, B nodes.

In step 208, the tail (last) K node for a K node path in the K tree built in step 204 is located.

In step 210, each A node is retrieved from the raw data (i.e. whole dataset) that includes the K node path with the last K node located in step 208.

In step 212, each A node retrieved in step 210 is connected to the last K node located in step 208.

In step 214, an A node is located from the A nodes retrieved in step 210.

In step 216, each B node is retrieved from the raw data (i.e. whole dataset) that includes the K node path with the last K node located in step 208.

In step 218, each B node retrieved in step 216 is connected to the A node located in step 214.

In step 220, the method 200 determines if there is another A node that includes the K node path with the last K node located in step 208. If there is another A node that includes the K node path with the last K node located in step 208, then the method 200 returns to step 214 to locate another A node. Otherwise, the method 200 proceeds to step 222.

Figure 7:
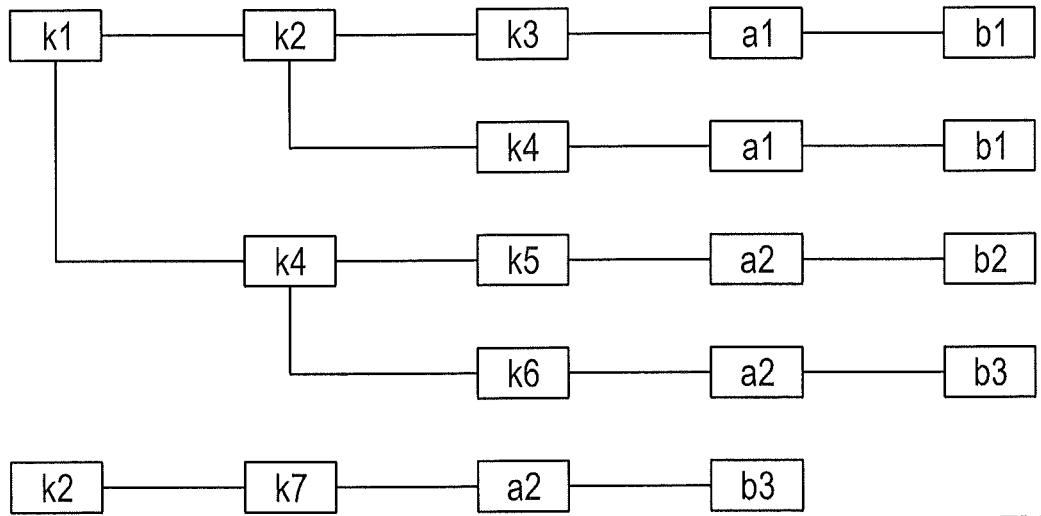
FIG. 7 is an exemplary tree-node diagram illustrating the result of steps 202-222 in FIG. 2.

In step 222, the method 200 determines if there is another K node path in the K tree built in step 204. If there is another K node path in the K tree built in step 204, then the method 200 returns to step 208 to locate the tail (last) K node for another K node path in the K tree built in step 204. Otherwise, the method 200 ends. In FIG. 7, an exemplary tree-node diagram illustrates the result of steps 202-222 based on a selected attribute node order of K nodes, A nodes and B nodes.

In step 224, the tail (last) K node for a K node path in the K tree built in step 204 is located.

In step 226, each B node is retrieved from the raw data (i.e. whole dataset) that includes the K node path with the last K node located in step 224.

In step 228, each B node retrieved in step 226 is connected to the last K node located in step 224.

In step 230, a B node is located from the B nodes retrieved in step 226.

In step 232, each A node is retrieved from the raw data (i.e. whole dataset) that includes the K node path with the last K node located in step 224.

In step 234, each A node retrieved in step 232 is connected to the B node located in step 230.

In step 236, the method 200 determines if there is another B node that includes the K node path with the last K node located in step 224. If there is another B node that includes the K node path with the last K node located in step 224, then the method 200 returns to step 230 to locate another B node. Otherwise, the method 200 proceeds to step 238.

Figure 8:
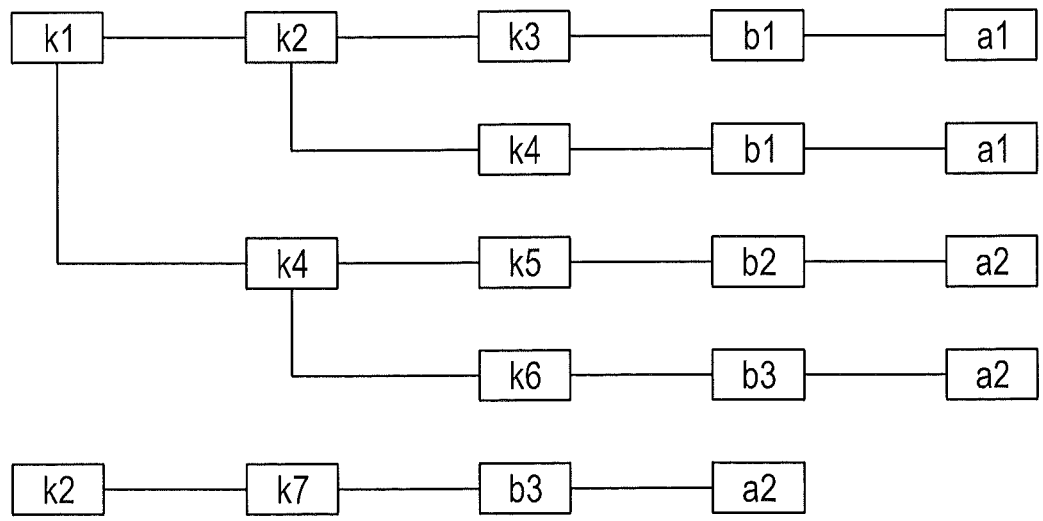
FIG. 8 is an exemplary tree-node diagram illustrating the result of steps 202-206 and 224-238 in FIG. 2.

In step 238, the method 200 determines if there is another K node path in the K tree built in step 204. If there is another K node path in the K tree built in step 204, then the method 200 returns to step 224 to locate the tail (last) K node for another K node path in the K tree built in step 204. Otherwise, the method 200 ends. In FIG. 8, an exemplary tree-node diagram illustrates the result of steps 224-238 based on a selected attribute node order of K nodes, B nodes and A nodes.

Referring now to FIG. 3, a flow diagram of another embodiment of a method 300 for performing step 106 in FIG. 1 is illustrated. In this embodiment, the method 300 builds a tree-node diagram with A nodes first based on the attribute node order selected in step 102.

In step 302, all A nodes are retrieved from the raw data (i.e. whole dataset).

In step 304, each A node is designated as a root node.

In step 306, the method 300 determines if the B nodes are the next level based on the attribute node order selected in step 102. If the B nodes are not the next level (i.e. A nodes, K nodes, B nodes), then the method 300 proceeds to step 324. Otherwise, the method 300 proceeds to step 308 because the attribute node order is A nodes, B nodes, K nodes.

In step 308, an A node is located from the A nodes retrieved in step 302.

In step 310, each B node is retrieved from the raw data (i.e. whole dataset) that includes the A node located in step 308 in a path.

In step 312, each B node retrieved in step 310 is connected to the A node located in step 308.

In step 314, a B node is located from the B nodes retrieved in step 310.

In step 316, each K node is retrieved from the raw data (i.e. whole dataset) that includes the B node located in step 314 in a path.

In step 318, a K tree is built with the K nodes retrieved in step 316. One embodiment of a method for performing this step is described further in reference to FIG. 5. The K tree is connected to the B node located in step 314.

In step 320, the method 300 determines if there is another B node that includes the A node located in step 308 in a path. If there is another B node that includes the A node located in step 308 in a path, then the method 300 returns to step 314 to locate another B node. Otherwise, the method 300 proceeds to step 322.

Figure 9:
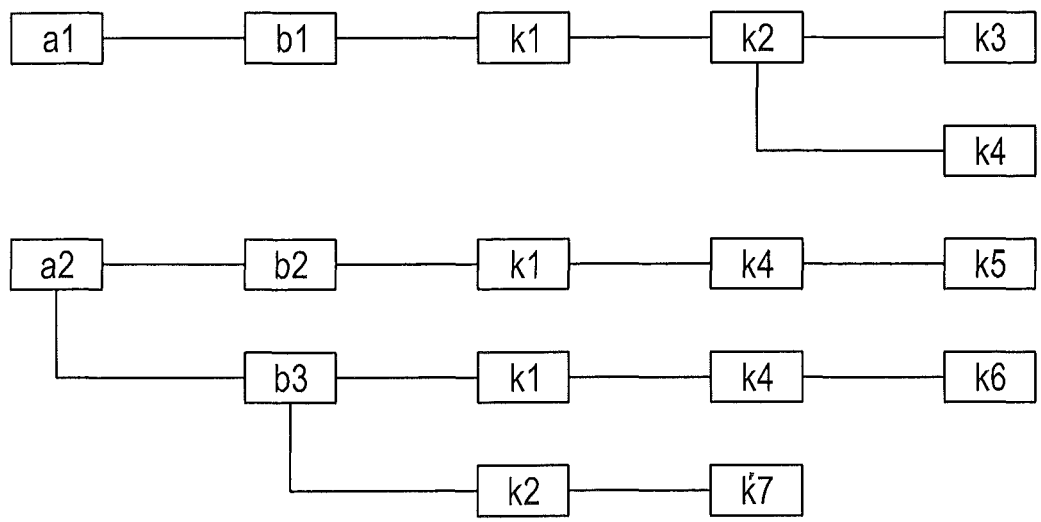
FIG. 9 is an exemplary tree-node diagram illustrating the result of steps 302-322 in FIG. 3.

In step 322, the method 300 determines if there is another A node retrieved in step 302. If there is another A node retrieved in step 302, then the method 300 returns to step 308 to locate another A node. Otherwise, the method 300 ends. In FIG. 9, an exemplary tree-node diagram illustrates the result of steps 302-322 based on a selected attribute node order of A nodes, B nodes and K nodes.

In step 324, an A node is located from the A nodes retrieved in step 302.

In step 326, each K node is retrieved from the raw data (i.e. whole dataset) that includes the A node located in step 324 in a path.

In step 328, a K tree is built with the K nodes retrieved in step 326. One embodiment of a method for performing this step is described further in reference to FIG. 5. The K tree is connected to the A node located in step 324.

In step 330, the tail (last) K node for a K node path in the K tree built in step 328 is located.

In step 332, each B node is retrieved from the raw data (i.e. whole dataset) that includes the K node path with the last K node located in step 330.

In step 334, each B node retrieved in step 332 is connected to the last K node located in step 330.

In step 336, the method 300 determines if there is another K node path in the K tree built in step 328. If there is another K node path in the K tree built in step 328, then the method 300 returns to step 330 to locate the tail (last) K node for another K node path in the K tree built in step 328. Otherwise, the method 300 proceeds to step 338.

Figure 10:
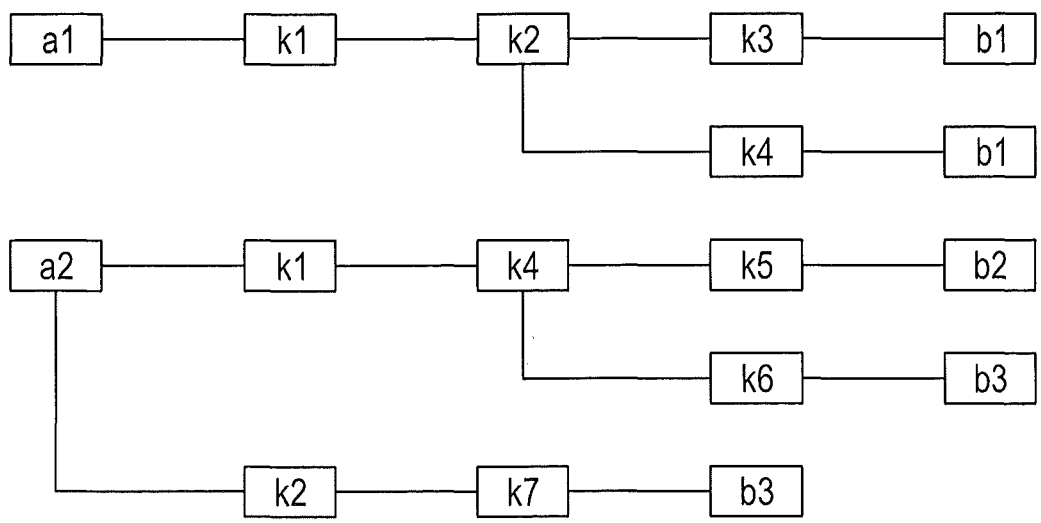
FIG. 10 is an exemplary tree-node diagram illustrating the result of steps 302-306 and 324-338 in FIG. 3.

In step 338, the method 300 determines if there is another A node retrieved in step 302. If there is another A node retrieved in step 302, then the method 300 returns to step 324 to locate another A node. Otherwise, the method 300 ends. In FIG. 10, an exemplary tree-node diagram illustrates the result of steps 324-338 based on a selected attribute node order of A nodes, K nodes and B nodes.

Referring now to FIG. 4, a flow diagram of another embodiment of a method 400 for performing step 106 in FIG. 1 is illustrated. In this embodiment, the method 400 builds a tree-node diagram with B nodes first based on the attribute node order selected in step 102.

In step 402, all B nodes are retrieved from the raw data (i.e. whole dataset).

In step 404, each B node is designated as a root node.

In step 406, the method 400 determines if the A nodes are the next level based on the attribute node order selected in step 102. If the A nodes are not the next level (i.e. B nodes, A nodes, K nodes), then the method 400 proceeds to step 424. Otherwise, the method 400 proceeds to step 408 because the attribute node order is B nodes, A nodes, K nodes.

In step 408, a B node is located from the B nodes retrieved in step 402.

In step 410, each A node is retrieved from the raw data (i.e. whole dataset) that includes the B node located in step 408 in a path.

In step 412, each A node retrieved in step 410 is connected to the B node located in step 408.

In step 414, an A node is located from the A nodes retrieved in step 410.

In step 416, each K node is retrieved from the raw data (i.e. whole dataset) that includes the A node located in step 414 in a path.

In step 418, a K tree is built with the K nodes retrieved in step 416. One embodiment of a method for performing this step is described further in reference to FIG. 5. The K tree is connected to the A node located in step 414.

In step 420, the method 400 determines if there is another A node that includes the B node located in step 408 in a path. If there is another A node that includes the B node located in step 408 in a path, then the method 400 returns to step 414 to locate another A node. Otherwise, the method 400 proceeds to step 422.

Figure 11:
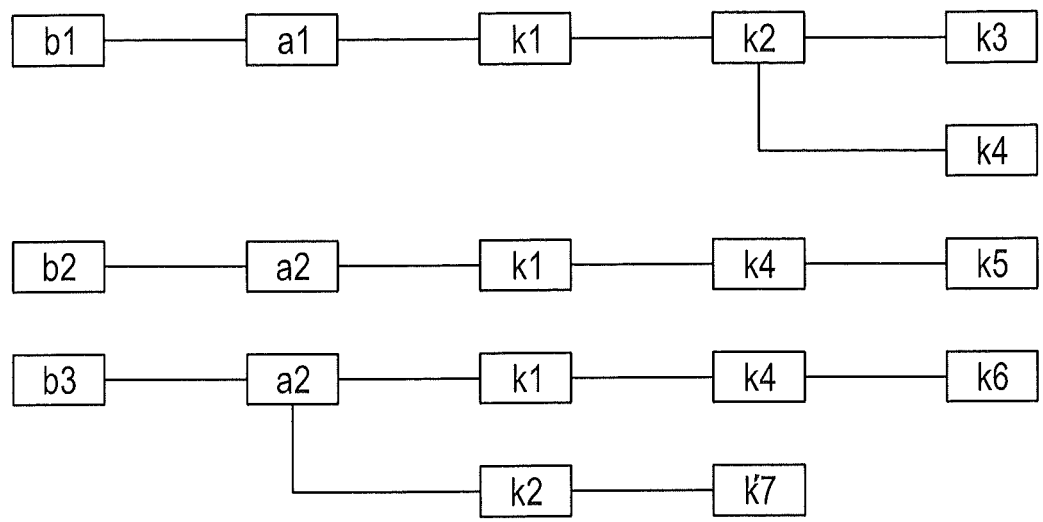
FIG. 11 is an exemplary tree-node diagram illustrating the result of steps 402-422 in FIG. 4.

In step 422, the method 400 determines if there is another B node retrieved in step 402. If there is another B node retrieved in step 402, then the method 400 returns to step 408 to locate another B node. Otherwise, the method 400 ends. In FIG. 11, an exemplary tree-node diagram illustrates the result of steps 402-422 based on a selected attribute node order of B nodes, A nodes and K nodes.

In step 424, a B node is located from the B nodes retrieved in step 402.

In step 426, each K node is retrieved from the raw data (i.e. whole dataset) that includes the B node located in step 424 in a path.

In step 428, a K tree is built with the K nodes retrieved in step 426. One embodiment of a method for performing this step is described further in reference to FIG. 5. The K tree is connected to the B node located in step 424.

In step 430, the tail (last) K node for a K node path in the K tree built in step 428 is located.

In step 432, each A node is retrieved from the raw data (i.e. whole dataset) that includes the K node path with the last K node located in step 430.

In step 434, each A node retrieved in step 432 is connected to the last K node located in step 430.

In step 436, the method 400 determines if there is another K node path in the K tree built in step 428. If there is another K node path in the K tree built in step 428, then the method 400 returns to step 430 to locate the tail (last) K node for another K node path in the K tree built in step 428. Otherwise, the method 400 proceeds to step 438.

Figure 12:
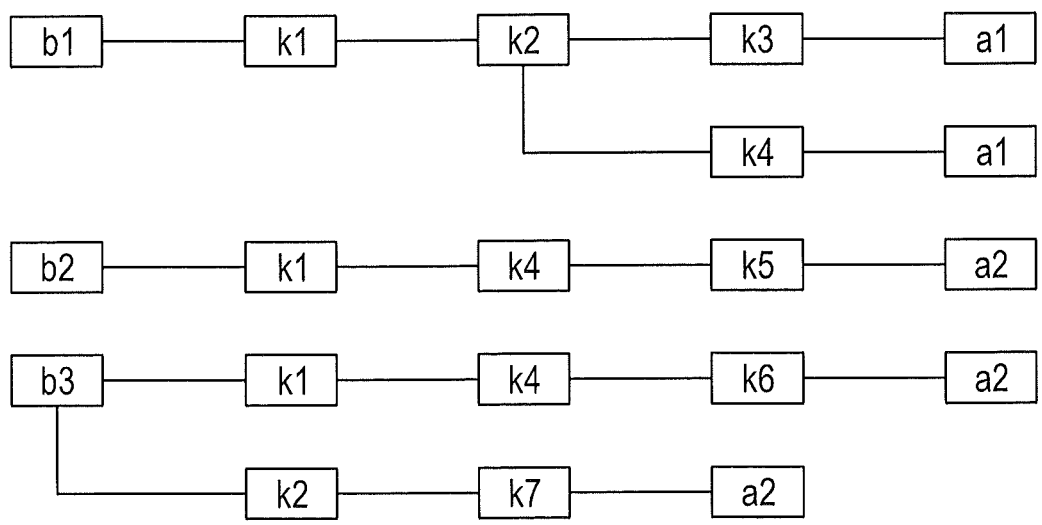
FIG. 12 is an exemplary tree-node diagram illustrating the result of steps 402-406 and 424-438 in FIG. 4.

In step 438, the method 400 determines if there is another B node retrieved in step 402. If there is another B node retrieved in step 402, then the method 400 returns to step 424 to locate another B node. Otherwise, the method 400 ends. In FIG. 12, an exemplary tree-node diagram illustrates the result of steps 424-438 based on a selected attribute node order of B nodes, K nodes and A nodes.

Figure 5:
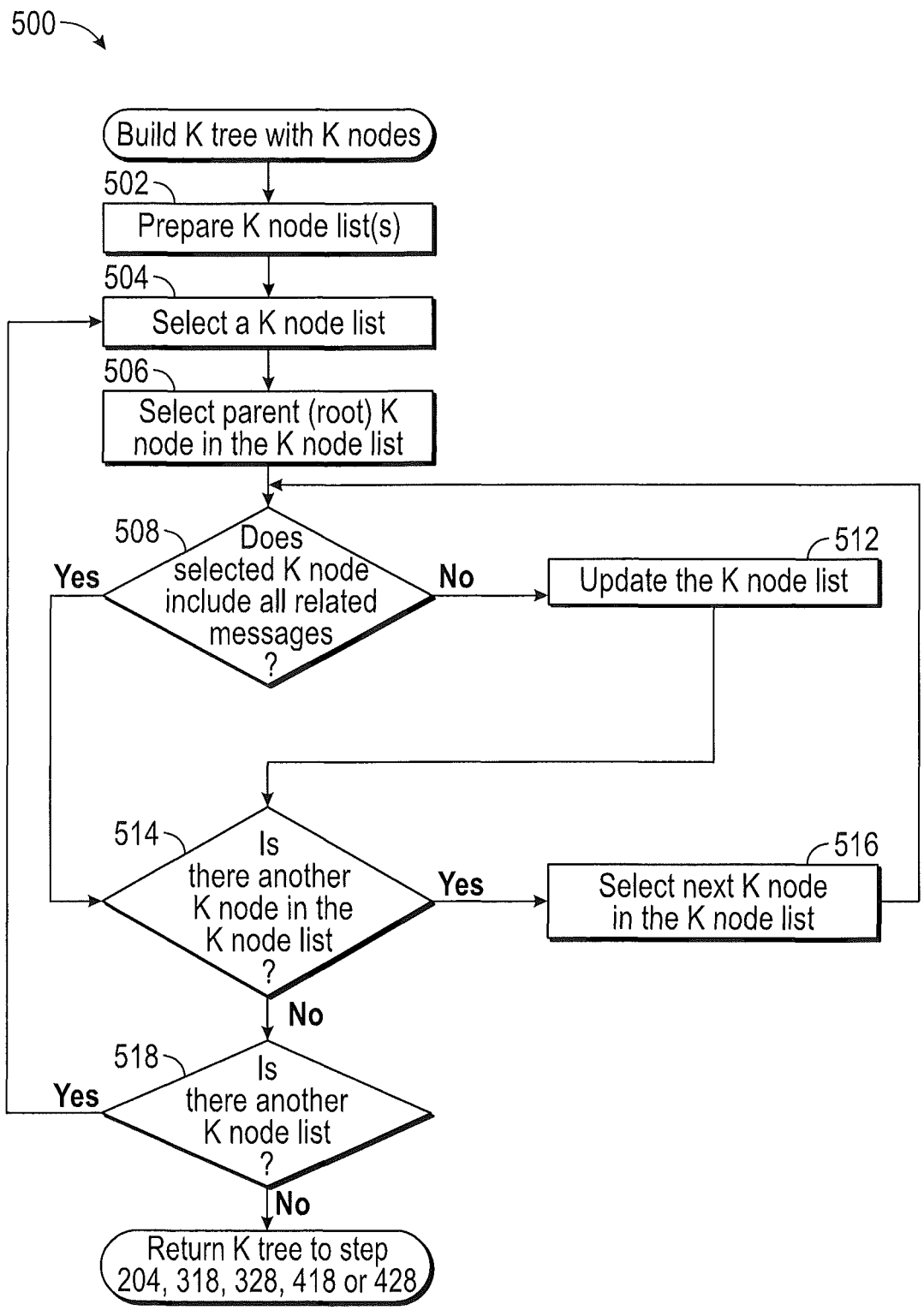
FIG. 5 is a flow diagram illustrating one embodiment of a method for performing steps 204, 318, 328, 418 and 428 in FIGS. 2-4.

Referring now to FIG. 5, a flow diagram of one embodiment of a method 500 for performing steps 204, 318, 328, 418 and 428 in FIGS. 2-4 is illustrated. The method 500 may be used to build a K tree with K nodes for use in the tree-node diagram.

In step 502, one or more K node lists are prepared using the K nodes retrieved from the raw data (i.e. whole dataset) and techniques well known in the art. Each K node list includes one or more K nodes that may be internally connected, thus forming a K node path, when multi-level data fields are used.

In step 504, a K node list is selected from the K node list(s) prepared in step 502.

In step 506, a parent (root) K node is selected from the K node list selected in step 504.

In step 508, the method 500 determines if the K node selected in step 506 or 516 includes all related messages from a related application. In this manner, the K tree may be updated with new messages in real-time until such time as there are no more new messages. If the K node selected in step 506 or 516 includes all related messages from a related application (i.e. there are no more new messages at the time), then the method 500 proceeds to step 514. Otherwise, the method 500 proceeds to step 512 to update the K node list selected in step 504.

In step 512, the K node list selected in step 504 is updated by creating another K node and connecting it to the K node selected in step 506 or 516 and the next K node in the K node list-if any.

In step 514, the method 500 determines if there is another K node in the K node list selected in step 504. If there is not another K node in the K node list selected in step 504, then the method 500 proceeds to step 518. Otherwise, the method 500 proceeds to step 516.

In step 516, the next K node in the K node list selected in step 504 is selected and the method 500 returns to step 508. If another K node is created in step 512, then this K node becomes the next K node in the K node list.

In step 518, the method 500 determines if there is another K node list from the K node list(s) prepared in step 502. If there is another K node list from the K node list(s) prepared in step 502, then the method 500 returns to step 504 to select another K node list. Otherwise, the method 500 returns the K tree to step 204, 318, 328, 418 or 428.

Referring now to FIG. 13, a table illustrates a general data structure with multiple fields for transferring the tree-node diagram(s) to a client to visualize each tree-node diagram. Each row represents a different path in the tree-node diagram. The columns for the A and B nodes include different respective attribute nodes in a single level data field for each, which means there is only one fixed layer in logic. The columns for K1, K2, K3 . . . Kn however, include different respective attribute nodes in multi-level data fields, which means they can be composited into one field in logic. The column for the X nodes is an example of another data field.

Although the attribute nodes in columns A, B, K1, K2, K3 . . . Kn are the same in rows 2 and 3, they may be different.

Referring now to FIG. 14, a table illustrates an optimization of the general data structure illustrated in FIG. 13. The optimization composites K1, K2, K3 . . . Kn together into a single level data field K.

Referring now to FIG. 15, an attribute index table and a mapping table for the attribute index table illustrate an optimization of the data structure illustrated in FIG. 14. The addition of a mapping table can save database space and network bandwidth usage by replacing the A, B and K nodes with a 1 bit integer in the attribute index table and using the mapping table to map the A, B and K nodes to a corresponding integer in the attribute index table. For example, the a1, b1 and k1-k2-k4 attribute nodes are designated with an attribute index integer '2,' which is the same for rows 2 and 3. In this manner, the attribute index table and mapping table can save significant database space and network bandwidth because there may be hundreds of thousands of data fields with hundreds of thousands of duplicated attribute nodes (e.g. A, B and K). The mapping table saves the attribute index integer into the primary database, which takes less space than the dataset in FIGS. 13-14. Moreover, only the mapping table may be required for transfer to a client if the client wants to build the tree-node diagram to preview and select the certain attributes nodes for filtering.

Figure 16:
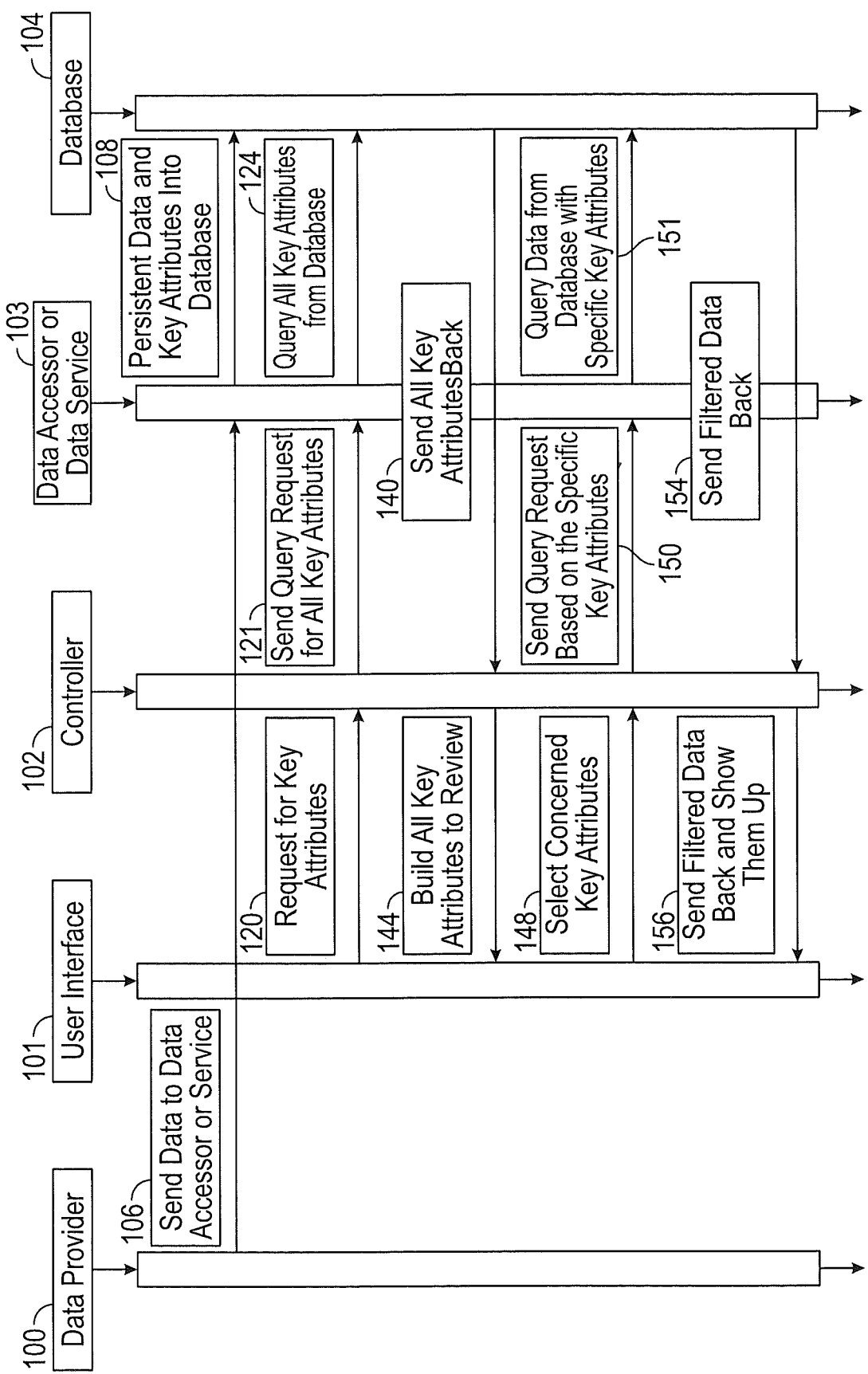
FIG. 16 is a block diagram illustrating one embodiment of a for implementing the present disclosure on a computer system.

Referring now to FIG. 16, a block diagram illustrates one embodiment of a method for implementing the present disclosure on a computer system. The raw data, which includes key attribute nodes, from the whole dataset may be sent from the data provider 100 to a data service 103 in step 106. The raw data and key attribute nodes may be persistent into a database 104 in step 108. At this stage, the key attribute nodes may be synchronized to any client(s) using the user interface 101. Now the key attribute nodes, with multiple levels and as a composition, are ready to use. The preferred key attribute nodes may be requested through the user interface 101 in step 120. The command dispatchers in the controller 102 may decrypt the request in step 120 and transmit the request to the data service 103 in step 121 to query all of the available key attribute nodes from the database 104 in step 124. After the key attribute nodes are transferred back to the clients in step 140, the tree-node diagram may be built in step 144. In order to focus on a preferred path, rather than the whole dataset, the user interface 101 may be used to tag certain key attribute nodes in the tree-node diagram to designate their selection in step 148. In this manner, any preferred path of key attribute nodes may be selected to view only the data of interest in step 150. The data service 103 retrieve the data of interest from the database 104 in step 151.

SYSTEM DESCRIPTION

The present disclosure may be implemented through a computer-executable program of instructions, such as program modules, generally referred to as software applications or application programs executed by a computer. The software may include, for example, routines, programs, objects, components, data structures, etc., that perform particular tasks or implement particular abstract data types. The software forms an interface to allow a computer to react according to a source of input. InSite™, which is commercial software application marketed by Landmark Graphics Corporation, may be used as interface application to implement the present disclosure. The software may also cooperate with other code segments to initiate a variety of tasks in response to data received in conjunction with the source of the received data. Other code segments may provide optimization components including, but not limited to, neural networks, earth modeling, history-matching, optimization, visualization, data management, reservoir simulation and economics. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Referring now to FIG. 17, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-16. The memory therefore, includes a data filtering and mining module, which enables steps 102 and 106 in FIG. 1. The data filtering and mining module may integrate functionality from the remaining application programs illustrated in FIG. 17. In particular, InSite™ may be used as an interface application to send the raw data from the whole dataset to the data filtering and mining module. Although InSite™ may be used as interface application, other interface applications may be used, instead, or the data filtering and mining module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/nonvolatile computer storage media or they may be implemented in the computing unit through an application program interface ("API") or cloud computing, which may reside on a separate computing unit connected through a computer system or network. For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, voice recognition or gesture recognition, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for filtering data using a multiple-level, composite-attribute tree-node diagram, which comprises:
 selecting an attribute node order of B nodes, A nodes and K nodes;
 building a K tree comprising multiple K nodes and one or more K node paths using a computer processor, wherein each K node path includes a K node that represents a root node and another K node that represents a last node;
 connecting, based on the attribute node order, one or more A nodes to at least one of i) each root node in the K tree, wherein each A node is connected to at least one of the root nodes in the K tree; ii) a respective last node in the K tree; and iii) a respective B node;
 connecting, based on the attribute node order, one or more B nodes to at least one of i) each root node in the K tree, wherein each B node is connected to at least one of the root nodes in the K tree; ii) a respective last node in the K tree; and iii) a respective A node; and
 wherein each K node comprises a key attribute that uniquely identifies a respective message, each A node comprises a respective computer attribute, and each B node comprises a respective application attribute, wherein the application attribute comprises a respective state of the application.

2. The method of claim 1, wherein the tree-node diagram includes multiple data fields and the multiple K nodes are not restrained to a single data field.

3. The method of claim 2, further comprising selecting a preferred attribute node order for connecting the multiple K nodes, the one or more A nodes and the one or more B nodes.

4. The method of claim 3, wherein the preferred attribute node order is based on a priority for filtering the multiple data fields in which the key attribute nodes, the computer attribute nodes and the application attribute nodes lie.

5. The method of claim 1, further comprising:
 displaying the tree-node diagram; and
 selecting one or more tree-node paths by tagging at least one of the key attribute nodes, the computer attribute nodes and the application attribute nodes.

6. The method of claim 1, wherein the tree-node diagram includes at least one of two or more separate tree-node paths and a connected tree-node path.

7. The method of claim 1, further comprising updating the K tree in real-time with one or more new messages from a related application.

8. The method of claim 7, wherein the K tree is updated by creating another K node for the one or more new messages.

9. The method of claim 1, further comprising creating an attribute index table for the data represented by the tree-node diagram, wherein the attribute index table only uses a one bit index integer to represent a respective tree-node path in the tree-node diagram comprising the multiple K nodes, the one or more A nodes and the one or more B nodes.

10. A non-transitory program carrier device tangibly carrying computer-executable instructions for filtering data using a multiple-level, composite-attribute tree-node diagram, the instructions being executable to implement:
 selecting an attribute node order of B nodes, A nodes and K nodes;
 building a K tree comprising multiple K nodes and one or more K node paths, wherein each K node path includes a K node that represents a root node and another K node that represents a last node;
 connecting, based on the attribute node order, one or more A nodes to at least one of i) each root node in the K tree, wherein each A node is connected to at least one of the root nodes in the K tree; ii) a respective last node in the K tree; and iii) a respective B node;
 connecting, based on the attribute node order, one or more B nodes to at least one of i) each root node in the K tree, wherein each B node is connected to at least one of the root nodes in the K tree; ii) a respective last node in the K tree; and iii) a respective A node; and wherein each K node comprises a key attribute that uniquely identifies a respective message, each A node comprises a respective computer attribute and each B node comprises a respective application attribute, wherein the application attribute comprises a respective state of the application.

11. The program carrier device of claim 10, wherein the tree-node diagram includes multiple data fields and the multiple K nodes are not restrained to a single data field.

12. The program carrier device of claim 11, further comprising selecting a preferred attribute node order for connecting the multiple K nodes, the one or more A nodes and the one or more B nodes.

13. The program carrier device of claim 12, wherein the preferred attribute node order is based on a priority for filtering the multiple data fields in which the key attribute nodes, the computer attribute nodes and the application attribute nodes lie.

14. The program carrier device of claim 10, further comprising:
   displaying the tree-node diagram; and
   selecting one or more tree-node paths by tagging at least one of the key attribute nodes, the computer attribute nodes and the application attribute nodes.

15. The program carrier device of claim 10, wherein the tree-node diagram includes at least one of two or more separate tree-node paths and a connected tree-node path.

16. The program carrier device of claim 10, further comprising updating the K tree in real-time with one or more new messages from a related application.

17. The program carrier device of claim 16, wherein the K tree is updated by creating another K node for the one or more new messages.

18. The program carrier device of claim 10, further comprising creating an attribute index table for the data represented by the tree-node diagram, wherein the attribute index table only uses a one bit index integer to represent a respective tree-node path in the tree-node diagram comprising the multiple K nodes, the one or more A nodes and the one or more B nodes.

19. A non-transitory program carrier device tangibly carrying computer-executable instructions for filtering data using a multiple-level, composite-attribute tree-node diagram, the instructions being executable to implement:
   selecting an attribute node order of B nodes, A nodes and K nodes;
   building a K tree comprising multiple K nodes and one or more K node paths, wherein each K node path includes a K node that represents a root node and another K node that represents a last node;
   connecting, based on the attribute node order, one or more A nodes to at least one of i) each root node in the K tree, wherein each A node is connected to at least one of the root nodes in the K tree; ii) a respective last node in the K tree; and iii) a respective B node;
   connecting, based on the attribute node order, one or more B nodes to at least one of i) each root node in the K tree, wherein each B node is connected to at least one of the root nodes in the K tree; ii) a respective last node in the K tree; and iii) a respective A node;
   wherein each K node comprises a key attribute that uniquely identifies a respective message, each A node comprises a respective computer attribute, each B node comprises a respective application attribute, wherein the application attribute comprises a respective state of the application; and
   the tree-node diagram including multiple data fields, wherein the multiple K nodes are not restrained to a single data field.

20. The program carrier device of claim 19, further comprising selecting a preferred attribute node order for connecting the multiple K nodes, the one or more A nodes and the one or more B nodes.

* * * * *